J. A. ROBERTSON.
CAMERA FINDER.
APPLICATION FILED OCT. 2, 1907.
937,266.
Patented Oct. 19, 1909.
2 SHEETS—SHEET 1.
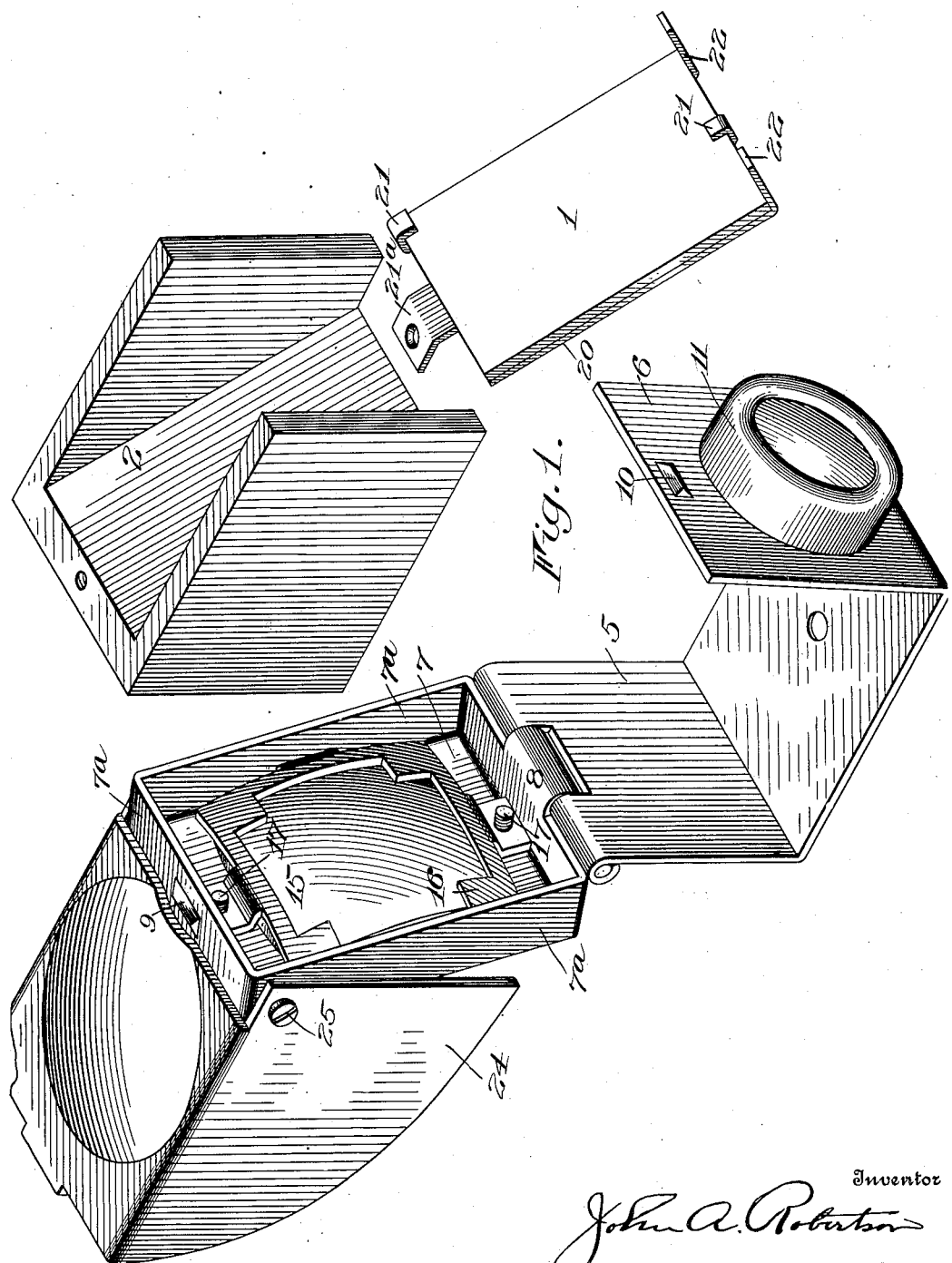
Witnesses
Walter B. Payne.
H H Simms
Inventor
John A. Robertson
By Church & Rich
His Attorneys

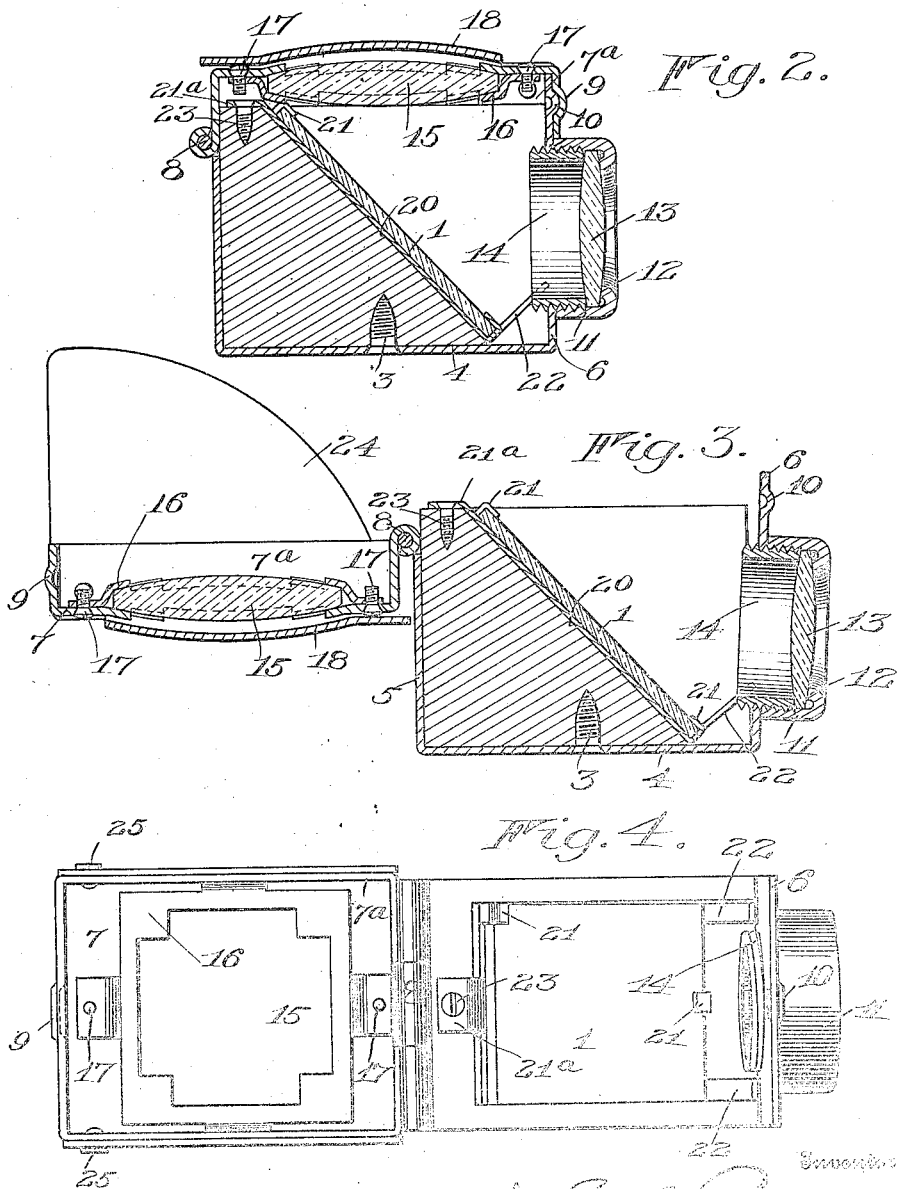

UNITED STATES PATENT OFFICE.

JOHN A. ROBERTSON, OF ROCHESTER, NEW YORK, ASSIGNOR TO EASTMAN KODAK CO., OF ROCHESTER, NEW YORK, A CORPORATION OF NEW YORK.

CAMERA-FINDER.

937,266.

Specification of Letters Patent.

Patented Oct. 19, 1909.

Application filed October 2, 1907. Serial No. 395,485.

*To all whom it may concern:*

Be it known that I, JOHN A. ROBERTSON, of Rochester, in the county of Monroe and State of New York, have invented certain new and useful Improvements in Camera-Finders; and I do hereby declare the following to be a full, clear, and exact description of the same, reference being had to the accompanying drawings, forming a part of the specification, and to the reference-numerals marked thereon.

The present invention relates to camera finders of the type in which a reflector is arranged to reflect objects within the field of a lens through a view opening having a lens or other device to give a clear image; one object thereof being to provide a construction in which the optical parts are rendered readily accessible for the purpose of permitting their being perfectly cleaned; and another object being to provide a construction which will be inexpensive to manufacture.

To these and other ends the invention consists in certain improvements and combinations of parts all as will be hereinafter more fully described, the novel features being pointed out in the claims at the end of the specification.

In the drawings: Figure 1 represents a detached perspective view of a finder constructed in accordance with this invention. Fig. 2 represents a central longitudinal section with the top of the casing and the hood in closed positions. Fig. 3 represents a like view with the top open. Fig. 4 represents a plan view with the top open.

Similar reference numerals in the several figures indicate similar parts.

Owing to the fact that the optical parts of a camera finder are small, it has been heretofore impossible to properly clean them. Numerous attempts have been made to render the parts readily accessible, but in all of these constructions while the parts may be reached, they are so mounted that a perfect cleaning cannot be given them. In this invention the result is obtained by mounting the hood and the wall containing the view opening in such a manner that upon the opening of the finder they are swung to a position where they will not interfere with the cleaning of the reflector or of the objective.

In the present embodiment of the invention, the reflector 1 is mounted on an inclined support 2, and, in order to permit it to be readily removed from its support, I may employ an attaching device which is in the form of a plate 20 having lugs 21 overhanging the reflector, a rearwardly extending ear $21^a$ at its upper end secured by screw 23 to the top of the support 2, and forwardly and upwardly extending projections 22 engaging the front wall 6 of the casing to prevent movement of the forward end thereof. The support 2 may rigidly connect the side walls, which are detachably secured to the other portions of the casing by a fastener 3 preferably in the form of a screw, passing through the bottom wall 4 into the support. The bottom wall, the rear wall 5, and the front wall 6 of the casing are preferably formed from a strip of sheet metal, the two latter walls extending upwardly from the bottom wall free of the side walls. To one of these upstanding walls, in this instance the rear wall 5, the top wall 7 is secured by being hinged thereto at 8, and this wall is provided with a surrounding flange $7^a$ engaging the side walls to prevent lateral displacement of the latter, a socket 9 or other locking element being arranged at its free end to coöperate with a stud 10 or other locking element on the upper end of the other upstanding wall, in this instance, the front wall. As the front wall 6 is secured only at its lower edge and is made of spring metal, it yields to permit the interlocking and disengaging of the top wall therewith. In the front wall is formed a circular opening in which is mounted the objective carrier in its preferred form comprising a tube 11 having an inwardly turned flange 12 at its outer end forming a lens seat for the objective 13, its inner wall being provided with threads with which engages an externally threaded tube 14 so that the latter may abut the lens 13 at one end to hold it against the flange and project from the inner end of the tube 11 to engage the wall of the opening in the casing. With this arrangement, the inner end of tube 11 rests against the outer wall and acts as a stop or shoulder to prevent inward movement of the carrier, and the lens carrier permits the use of lenses of greater thickness than that shown, as the externally threaded tube 14 may be screwed into the tube 11 a shorter distance than shown.

The view opening containing the focusing screen is formed in the top or cover of the casing and for the purpose of producing a clear and sharply defined image a double convex lens 15 is employed as a field, which is preferably secured to the top or cover so as to swing therewith by a rim plate 16 which surrounds and engages the lower surface of the lens and is secured to the top by screws 17 or other suitable means. Arranged preferably on the top wall is a hood 18 which has depending side flanges 24 pivoted at the front end of the top wall to the flange at 25 so that when open the edge of the hood which is in proximity to the front of flange 7ª will engage with the latter and limit its movement.

In operation the objective is pointed at the object in the usual manner, and if the hood be raised the image on the reflector will be visible through the view opening. To clean the parts the top wall is raised so that the reflector 1, the objective 13 and the lens 15 will be readily accessible. The removal of the reflector from its support may be accomplished by withdrawing the single screw or fastener 23, while the reflector support may be removed by withdrawing fastener 3.

From the foregoing it will be apparent that the hinging of the top wall to the rear wall and the hinging of the hood to the free end of the top wall, permits these parts to be thrown to positions away from the objective and the reflector when the casing is open. The engagement of the top wall with an upwardly extending wall dispenses with the necessity of providing a separate locking device, thus reducing the cost of manufacture.

By forming the body portion of the casing in the manner shown, the part thereof supporting the reflector may be made from a single block of wood or other inexpensive material and the inclined surface 2 thereof may be located between the walls 2ª which form the sides of the casing. The remaining portion of the casing being entirely made of metal, the various parts thereof may be readily assembled and the finder completed by inserting the reflector support and securing it by the screw 3.

It will be noticed that the width of the support 2 is the same as the walls 4, 5 and 6 so that when the cover portion carrying the lens 15 is closed the depending walls 7ª thereof will overlap the upper edges of the walls 2ª and 6 completely closing the finder casing.

I claim as my invention:

1. A camera finder comprising a casing having its top wall hinged to its rear wall and provided with a view opening, a transparent closure for the view opening carried by the top wall, a reflector arranged within the casing, and a lens carried by the front wall of the casing.

2. A camera finder comprising a casing having its top wall hinged to its rear wall and provided with a view opening, a transparent closure for the view opening carried by the top wall, a reflector arranged within the casing, a lens carried by the front wall of the casing, and a hood hinged to the front edge of the top wall.

3. In a camera finder, the combination of a casing comprising a front, a rear and a bottom wall formed of one piece of material, side walls connected independently of the bottom and secured thereto, and a top wall hinged to one of the upstanding walls and having a view opening, with a reflector carried by the side walls, and a lens carried by the front wall.

4. In a camera finder, the combination of a casing comprising side walls, a bottom wall secured to the side walls, a front and a rear wall projecting upwardly from the bottom wall free of the side walls, a top provided with a view opening hinged to one of said upwardly projecting walls and interlocking with the other, with a reflector arranged within the casing, and a lens carried by the front wall.

5. In a camera finder, the combination of a casing comprising side walls, a bottom wall secured to the side walls, a front and a rear wall projecting upwardly from the bottom wall free of the side walls, and a top provided with a view opening, hinged to one of said upwardly projecting walls, interlocking with the other and having a flanged rim to engage on the outside of the side walls, with a reflector arranged within the casing, and a lens carried by the front wall.

6. In a camera finder, the combination of a casing comprising a pair of side walls, an inclined reflector support connecting the side walls, a bottom wall secured to the side walls, a front and a rear wall projecting upwardly from the bottom wall free of the side walls, and a top wall having a flanged rim and a view opening, hinged to the rear wall and adapted to interlock with the front wall, with a reflector mounted in the casing on the inclined support, a lens carried by the front wall, and a hood hinged to the front end of the top wall.

7. In a camera finder, the combination with a casing comprising a bottom wall, side walls, a front wall extending upwardly from the bottom wall free of the side walls, a rear wall and a top wall hinged to the rear wall, interlocking with the front wall and having a view opening, of a reflector within the casing, and a lens mounted in the front wall.

8. A camera finder comprising a casing, having a hinged wall provided with a view opening, a transparent closure for the view opening carried by the hinged wall, and a hood hinged to the free end of the hinged wall.

9. In a camera finder, a casing having a hinged top wall provided with a depending flange and a view opening, a transparent closure for the view opening carried by the hinged wall, and a hood having side flanges pivoted to the depending flange on the top wall.

10. In a camera finder, the combination of a casing comprising a top wall hinged to its rear wall, and provided with a depending flange and a view opening, and a transparent closure for the view opening carried by the top wall, with a hood hinged to the front edge of the top wall.

11. In a camera finder, the combination with a casing having an opening in a wall thereof, of a lens carrier comprising an internally threaded tube having a flange at its outer end, and externally threaded tube engaging the walls of the opening and the inner wall of the tube, and a lens arranged between the flange and the inner end of the externally threaded tube.

12. In a camera finder, the combination with a casing and an inclined support therein, of a reflector attaching device secured at its upper end to the support and comprising a plate having means for engaging a reflector, and forwardly projecting lugs engaging the front wall.

13. In a finder, the combination with a body portion having one end closed, one open end and two separated side walls and a reflector located between the latter, of a casing secured to the body having forward and rear ends extending over the open and closed ends of the body respectively, a lens arranged in the forward end of the casing, a cover embracing the ends of the casing and the side walls of the body and a focusing screen arranged in said cover.

JOHN A. ROBERTSON.

Witnesses:
F. M. WARN,
C. E. HUTCHINGS.